United States Patent [19]

Johnson et al.

[11] Patent Number: 5,516,477
[45] Date of Patent: May 14, 1996

[54] RESIN MOLDING PROCESS UTILIZING A GLASS CORE

[75] Inventors: Carl F. Johnson, Belleville; Brenda M. Vyletel, Ann Arbor, both of Mich.

[73] Assignee: Ford Motor Company, Dearborn, Mich.

[21] Appl. No.: 283,412

[22] Filed: Aug. 1, 1994

[51] Int. Cl.⁶ .......................... B29C 45/14; B29C 45/44; B29C 33/38
[52] U.S. Cl. .......................... 264/221; 249/61; 249/134; 264/257; 264/317; 264/328.1; 264/328.16; 425/DIG. 12
[58] Field of Search .................. 264/221, 317, 264/328.1, 328.16, 257, 258, DIG. 44; 249/134, 61; 425/577, DIG. 12, DIG. 58; 65/114, 115

[56] References Cited

U.S. PATENT DOCUMENTS

| | | | |
|---|---|---|---|
| 2,078,541 | 4/1937 | Monnier | 65/115 |
| 2,217,734 | 10/1940 | Dreyfus | 264/317 |
| 2,757,439 | 8/1956 | Burns | 264/317 |
| 4,094,688 | 6/1978 | Wolf | 264/317 |
| 4,248,817 | 2/1981 | Frank | 264/317 |
| 4,483,700 | 11/1984 | Forker, Jr. et al. | |
| 5,169,590 | 12/1992 | Johnson et al. | |

FOREIGN PATENT DOCUMENTS

| | | | |
|---|---|---|---|
| 58-28361 | 2/1983 | Japan | 264/317 |
| 62-289213 | 12/1987 | Japan | 264/317 |

Primary Examiner—Jill L. Heitbrink
Attorney, Agent, or Firm—Charles H. Ellerbrock; Roger L. May

[57] ABSTRACT

A molded article is prepared by forming a glass core, treating the glass core to induce residual stresses therein, inserting the core into a mold, injecting resin into the mold, curing the resin, fracturing the core to produce glass particles, and removing the glass particles from the molded article.

12 Claims, No Drawings

RESIN MOLDING PROCESS UTILIZING A GLASS CORE

FIELD OF THE INVENTION

This invention relates generally to a resin molding process which utilizes a core made of glass. More particularly, the invention is directed to a resin molding process wherein a glass core is inserted in a mold, the resin is injected into the mold thereby surrounding the core, the molded article is removed from the mold, and the glass core is removed from the molded article.

BACKGROUND OF THE INVENTION

Many automotive components are made from reinforced and unreinforced plastics. Weight savings are achieved by using hollow cores in the plastic molding processes for making such components. Core elements for such molded parts are generally tubular metal or solid foam thermoplastic materials. Because of the complex shapes of the molded articles and cores used to make automotive components, the cores are generally not removable, and therefore are left encapsulated in the finished part. Thus, molders have been motivated to use lighter-weight core materials, to reduce the overall weight of the ultimately produced articles.

U.S. Pat. No. 5,169,590 discloses the use of flexible blow molded thermoplastic cores in resin molding processes. The cores are retained in, and add weight to, the ultimately produced molded parts. The temperatures at which the parts may be molded are limited by the softening temperatures of the thermoplastic cores utilized. Moreover, if the thermoplastic cores are excessively preheated in the molds, lower injection pressures must be used to prevent surface deflection of the core elements.

It would be desirable to mold plastic components using cores which allow high temperature and/or high pressure molding conditions, while eliminating the added weight of the core material in the ultimately produced molded parts.

SUMMARY OF THE INVENTION

Accordant with the present invention a process for molding an article has surprisingly been discovered. The process comprises the steps of:

forming a glass core;

treating the glass core to induce residual stresses therein;

inserting the glass core into a mold;

injecting resin into the mold;

curing the resin to prepare a molded article;

fracturing the glass core to form glass particles; and separating the glass particles from the molded article.

Moreover, the invention is directed to an intermediate article formed while practicing the inventive process, said article comprising cured resin at least partially encapsulating a glass core having residual stresses therein.

The process and article according to the present invention is particularly well suited for manufacturing fiberglass reinforced structural components for use in vehicles.

DETAILED DESCRIPTION OF THE PREFERRED EMBODIMENT

This invention is directed to a process for molding an article, wherein a glass core is formed then treated to induce residual stresses, placed into a mold and at least partially encapsulated by resin injected into the mold, and separated from the molded article by fracturing the glass core to produce glass particles. The glass core may be solid glass, or it may be a hollow glass core. Solid glass cores may be prepared by conventional glass forming techniques such as, for example, casting the core from molten glass to produce the desired core configuration, or press bending a softened glass billet to the desired shape. Hollow glass cores may be formed by the conventional techniques of blow molding such as is used in the glass container industry, rotational casting, etc. By the term "glass" as it is used herein is meant glass and ceramic materials, including quartz and pyroceramics.

After the glass core is formed, it is treated to induce residual stresses therein by a conventional method. Conveniently, the glass core may be tempered by directing streams of tempering fluid (usually air) against the surfaces of the glass core while it is above its plastic set temperature. Tempering a solid glass core may be accomplished by directing the tempering fluid against the outer surface of the core. A hollow glass core may be tempered by directing the tempering fluid against the outer surfaces of the core while simultaneously directing the tempering fluid against the inner surfaces of the core utilizing a lance manifold. It is well-known that tempered glass, when broken, forms glass particles, the sizes and shapes of which are determined by the degree of tempering. By routine optimization, one ordinarily skilled in the art can determine the degree of tempering required to minimize the sizes of the glass particles formed when any particular glass core is fractured.

Alternatively, residual stresses may be induced in the glass core by strengthening via an ion exchange process. Such a process changes the chemical composition of the surface of the glass core, imparting a surface compressive layer thereto. The ion exchange process generally exchanges a small surface ion such as sodium or lithium for larger ions such as potassium. Useful core glasses for performing ion exchange include sodium silicate type glasses containing a substantial amount of alumina and/or zirconia. Suitable contacting media include molten salt baths maintained at temperatures in a range from about 600° C. to about 800° C. The depth of ion penetration and resulting degree of residual stress produced can be controlled by adjusting the time and temperature conditions above and below the glass strain free temperature. Methods for inducing residual stresses into a glass core are more fully set forth in U.S. Pat. No. 4,483,700, which is incorporated herein in its entirety by reference thereto.

After the glass core has been treated to induce residual stresses therein, and before it is inserted into the mold, it optionally may be treated with a conventional mold release agent such as, for example, tetrafluoroethylene spray, and/or overlaid with a fibrous reinforcement material such as, for example, glass, ceramic, high temperature organic, or metal fibers. Such fibers may be individual fibers, fiber bundles, woven or nonwoven fiber mats, braided fibers or fiber bundles, etc.

Moreover, the glass core may be preheated to the article molding temperature before it is inserted into the mold. This is a distinct advantage of the glass core over conventionally used foamed organic cores, which generally must be preheated after being placed in a mold due to the thermal expansion and flexing of such cores caused by preheating. The glass core of the present invention may be preheated before being inserted into the mold because it has superior rigidity and dimensional stability relative to conventionally used foamed organic cores.

The glass core is inserted into the mold in any manner generally used in the molding industry. For example, a mold comprising a pair of opposing dies may be separated and the glass core positioned within the cavity of one of the mold halves. This method of inserting a core into a mold is set forth in U.S. Pat. No. 5,169,590 which is incorporated herein in its entirety by reference thereto. Alternatively, a plurality of glass cores may be inserted into the cavity of a single mold. The mold is then closed in preparation for the injection of a resin into the mold cavity.

Resin is injected into the mold by conventional techniques such as, for example, resin transfer molding, reaction injection molding, structural reaction injection molding, etc. The resin may contain chopped fibers of the reinforcing materials mentioned hereinabove. If the glass core is overlaid with fibrous reinforcement prior to being inserted into the mold, the injected resin will wet out and encapsulate the reinforcement during the injection process. Either thermoplastic or thermoset resins may be used to practice the present invention. A preferred resin comprises a cyclic ester such as a copolymer of polyethylene terephthalate and polybutylene terephthalate, well-known in the industry.

The resin may be injected at much higher temperatures than are conventionally used for injecting thermosetting resins into molds containing foamed or unfoamed organic cores. The glass core can easily withstand injection temperatures in excess of 200° C. (and therefore, lower resin viscosities are experienced during the injection process) and pressures in excess of 500 psi, substantially without experiencing surface deflection. This allows the precise metering of the shot amount at a faster rate while maintaining precise control of the wall thickness of the ultimately produced part.

Depending upon the positioning of the glass core within the mold, the injected resin may completely encapsulate the core, or the resin may only contact a portion of the surface of the glass core thereby resulting in a molded article wherein a portion of the surface of the glass core is exposed.

Following injection of the resin, it is cured to form the molded part. By the term "cure" as it is used herein is also meant the solidification or in situ polymerization of a thermoplastic resin. After the molded part is cured, it may be removed from the mold.

The glass core is fractured in order to remove it from the molded article. Where the glass core is exposed, it may simply be struck by a rigid object with a force sufficient to overcome the residual compressive forces at the surface of the core, thereby causing the core to shatter into glass particles. Due to the residual stresses throughout the glass core, the entire core may be fractured by striking it in one spot. Thus, multiple apertures through the wall of the cured resin are not required in order to remove the core (although multiple apertures may be used if desired). Where the glass core is completely encapsulated by the cured resin, a portion of the cured resin must be removed in order to expose the surface of the glass core beneath. This may be accomplished simply by boring a hole through the wall of the cured resin article.

The glass particles are then separated from the molded article by simply pouring them out through the aperture where the glass core is exposed. To assist in the separation of the glass particles, the molded article may be shaken or vibrated. Glass cores having smooth surfaces in contact with the cured resin will, of course, be easier to separate after being fractured into glass particles. Thus, glass core forming processes which result in smooth surfaces are preferred for practicing the present invention. For example, the glass core may be fire polished by conventional means in order to form a glass core having a smooth exterior surface.

The resultant product according to the present invention is a molded article having a hollow cavity therein of substantially the same size and configuration as the exterior surface of the separated glass core.

From the foregoing description, one ordinarily skilled in the art can easily ascertain the essential characteristics of the invention and, without departing from the spirit and scope thereof, can make various changes and modifications to the invention to adapt it to various usages and conditions.

What is claimed is:

1. A process for molding an article, comprising:

forming a glass core;

treating the glass core to induce residual stresses therein;

inserting the glass core into a mold;

injecting resin into the mold;

curing the resin to prepare a molded article;

fracturing the glass core to form glass particles; and separating the glass particles from the molded article.

2. The process for molding an article according to claim 1, wherein the glass core is a hollow glass core.

3. The process for molding an article according to claim 1, wherein the glass core is tempered.

4. The process for molding an article according to claim 1, wherein the glass core is chemically treated to induce residual stresses therein.

5. The process for molding an article according to claim 1, wherein the glass core is overlaid with a fibrous reinforcement before it is inserted into the mold.

6. The process for molding an article according to claim 1, wherein the glass core is preheated before it is inserted into the mold.

7. The process for molding an article according to claim 1, wherein a plurality of glass cores are inserted into the mold.

8. The process for molding an article according to claim 1, wherein the injected resin contacts only a portion of the surface of the glass core.

9. The process for molding an article according to claim 1, wherein the glass particles are separated from the molded article through multiple apertures in a wall of the molded article.

10. The process for molding an article according to claim 1, wherein the molded article is vibrated to assist in separating the glass particles from the molded article.

11. The process for molding an article according to claim 1, wherein the formed glass core is fire polished.

12. A process for molding an article, comprising:

forming a glass core;

tempering the glass core to induce residual stresses therein;

overlaying the glass core with fibrous reinforcement;

heating the glass core and fibrous reinforcement;

inserting the glass core and fibrous reinforcement into a mold;

injecting resin into the mold;

curing the resin to prepare a molded article;

fracturing the glass core to form glass particles; and separating the glass particles from the molded article.

* * * * *